United States Patent
Moon et al.

(10) Patent No.: US 8,552,590 B2
(45) Date of Patent: Oct. 8, 2013

(54) ENERGY MANAGEMENT SYSTEM AND GRID-CONNECTED ENERGY STORAGE SYSTEM INCLUDING THE ENERGY MANAGEMENT SYSTEM

(75) Inventors: Chong-Sop Moon, Yongin-si (KR); Jung-Pil Park, Yongin-si (KR)

(73) Assignee: Samsung SDI Co., Ltd., Yongsin-si (KR)

(*) Notice: Subject to any disclaimer, the term of this patent is extended or adjusted under 35 U.S.C. 154(b) by 325 days.

(21) Appl. No.: 12/852,333

(22) Filed: Aug. 6, 2010

(65) Prior Publication Data

US 2011/0115295 A1 May 19, 2011

Related U.S. Application Data

(60) Provisional application No. 61/262,883, filed on Nov. 19, 2009.

(51) Int. Cl.
*H02J 9/00* (2006.01)

(52) U.S. Cl.
USPC .................. 307/64; 307/80; 307/82

(58) Field of Classification Search
USPC ......................... 307/84, 64, 80, 82
See application file for complete search history.

(56) References Cited

U.S. PATENT DOCUMENTS

| | | | | |
|---|---|---|---|---|
| 2004/0207366 A1* | 10/2004 | Sung | ............................. | 320/140 |
| 2005/0184594 A1* | 8/2005 | Fredette | ........................ | 307/78 |
| 2008/0252149 A1* | 10/2008 | McCoy et al. | ................ | 307/128 |
| 2011/0095606 A1* | 4/2011 | Ou | ................................... | 307/26 |
| 2011/0115295 A1 | 5/2011 | Moon et al. | | |

FOREIGN PATENT DOCUMENTS

| | | |
|---|---|---|
| JP | 08-009648 | 1/1996 |
| JP | 2000-181556 | 6/2000 |
| JP | 2000-308370 | 11/2000 |
| JP | 2001-095179 | 4/2001 |
| JP | 2002-078205 | 3/2002 |
| JP | 2002-171674 | 6/2002 |
| JP | 2002-354677 | 12/2002 |
| JP | 2007-525139 | 8/2007 |
| JP | 2008-017652 | 1/2008 |
| JP | 2009-033797 | 2/2009 |
| JP | 2009-033802 | 2/2009 |
| KR | 1020040086997 A | 10/2004 |
| KR | 1020080065818 A | 7/2008 |

OTHER PUBLICATIONS

Patent Abstracts of Japan, and English machine translation of Japanese Publication 2000-308370 listed above, (11 pages).

(Continued)

*Primary Examiner* — Robert L. Deberadinis
(74) *Attorney, Agent, or Firm* — Christie, Parker & Hale, LLP

(57) ABSTRACT

An energy management system includes: a first interface configured to receive a first power from a power generation system; a second interface configured to couple to the power generation system, a power grid, and a storage device, and to receive at least one of the first power from the power generation system, a second power from the power grid, or a third power from the storage device, and to supply a fourth power to at least one of the power grid or a load; and a third interface configured to receive the third power from the storage device, and to supply a fifth power to the storage device for storage.

22 Claims, 6 Drawing Sheets

(56) References Cited

OTHER PUBLICATIONS

Japanese Office action dated Sep. 25, 2012, for corresponding Japanese Patent application 2010-248927, (5 pages).
Patent Abstracts of Japan, and English machine translation of Japanese Publication 2002-078205 listed above, (11 pages).
Patent Abstracts of Japan, and English machine translation of Japanese Publication 2002-351677, previously filed in an IDS dated Aug. 6, 2010, (14 pages).
JPO Office action dated May 26, 2013, for corresponding Japanese Patent application 2010-248927, (5 pages).
Patent Abstracts of Japan, and English machine translation of Japanese Publication 2001-095179, dated Apr. 6, 2011, listed above, (21 pages).
JPO Office action dated May 28, 2013, for corresponding Japanese Patent application 2010-248927, (3 pages).
Patent Abstracts of Japan, and English machine translation of Japanese Publication 08-009648 dated Jan. 12, 1996, listed above, (13 pages).

* cited by examiner

ENERGY MANAGEMENT SYSTEM AND GRID-CONNECTED ENERGY STORAGE SYSTEM INCLUDING THE ENERGY MANAGEMENT SYSTEM

CROSS-REFERENCE TO RELATED APPLICATIONS

This application claims priority to and the benefit of U.S. Provisional Application No. 61/262,883, filed on Nov. 19, 2009, in the United States Patent and Trademark Office, the entire content of which is incorporated herein by reference.

BACKGROUND

1. Field

One or more embodiments of the present invention relate to an energy management system, and more particularly, to a grid-connected energy storage system including an energy management system.

2. Description of the Related Art

Interest in harnessing renewable or green energy resources has been increasing recently. Various forms of renewable energy resources (e.g., solar, wind or geothermal power) are harnessed to generate electricity. The generated electricity is supplied to the power grid to reach homes and businesses. Prior to being supplied to the power grid, the generated electricity may be stored in a storage device. Further, systems need to be put into place to accommodate interruptions in the supply of power from the renewable energy resource. Also, it is necessary to convert the power into a form that may be appropriately stored or utilized.

SUMMARY OF THE INVENTION

An aspect of an embodiment of the present invention is directed toward a grid-connected energy storage system including an energy management system.

An embodiment of the present invention provides an energy management system including: a first interface configured to receive a first power from a power generation system; a second interface configured to couple to the power generation system, a power grid, and a storage device, and to receive at least one of the first power from the power generation system, a second power from the power grid, or a third power from the storage device, and to supply a fourth power to at least one of the power grid or a load; and a third interface configured to receive the third power from the storage device, and to supply a fifth power to the storage device for storage.

The second interface may be configured to receive the second power and the first power converted by the first interface concurrently or at different times.

The third interface may be further configured to receive at least one of the first power converted by the first interface or the second power converted by the second interface.

The third interface may be configured to receive the third power, the first power converted by the first interface, and the second power converted by the second interface, concurrently or at different times.

The system may be configured to store the first power in the storage device via the third interface as the fifth power, or to transfer the first power via the second interface to at least one of the power grid or the load as the fourth power.

The system may be further configured to supply the first power or the third power to the load as the fourth power even if the power grid is in a normal operating state.

The system may be configured to store the second power from the power grid in the storage device via the second and third interfaces as the fifth power, or to supply the second power to the load.

The system may be configured to supply the third power from the storage device via the second interface to the power grid or the load as the fourth power.

The first interface may include a first power converter configured to convert the first power from DC or AC power to a DC sixth power.

The first power converter may be further configured to perform maximum power point tracking control to obtain a maximum power generated by the power generation system.

The second interface may include a second power converter and the third interface may include a third power converter, wherein the second power converter is configured to: convert the DC sixth power to the fourth power, which is an AC power; convert a seventh power from the third power converter from DC power to the fourth power; and convert the second power from AC power to an eighth power, which is a DC power, and wherein the third power converter is configured to: convert the sixth power or the eighth power to the fifth power; and convert the third power to the seventh power.

The second power converter may be further configured to control a power conversion efficiency.

The third power converter may be further configured to control a power conversion efficiency.

The energy management system may further include: a first switch between the second power converter, and the power grid and the load; and a second switch between the first switch and the power grid wherein the first and second switches are configured to be controlled in accordance with a control signal from a controller.

The controller may be configured to turn the first switch on and the second switch off to supply the fourth power to the load.

The energy management system may further include a controller configured to: receive at least one of a voltage sensing signal, a current sensing signal or a temperature sensing signal from at least one of the first, second and third power converters; output a pulse width modulation control signal to at least one of the first, second or third power converters; monitor a status of at least one of the storage device, the power grid, or the load; determine a driving mode; and control conversion operations and/or efficiencies of at least one of the first, second, and third converters or the first and second switches.

The energy management system may further include a DC stabilizer between the first and third power converters and the second power converter, and configured to maintain a constant DC voltage level at an input of the second power converter and at an input of the third power converter.

The DC stabilizer may include a capacitor.

The first interface may include a maximum power point tracking converter configured to: convert the AC or DC first power to a sixth power, which is a DC power; and perform a maximum power point tracking control for tracking the maximum output voltage from the power generation system.

The second interface may include a bi-directional inverter and the third interface may include a bi-directional converter, wherein the bi-directional inverter is configured to: convert the DC sixth power to the fourth power, which is an AC power; convert a seventh power from the bi-directional converter from DC power to the fourth power; and convert the second power from AC power to an eighth power, which is a DC power, and wherein the bi-directional converter is configured to: convert the sixth power or the eighth power to the fifth power; and convert the third power to the seventh power.

The energy management system may further include a DC link capacitor between the bi-directional inverter, and the MPPT converter and the bi-directional converter, and configured to: supply the sixth power to the bi-directional inverter or the bi-directional converter; and stabilize the DC voltage level at an input of the bi-directional converter and at an input of the bi-directional inverter.

The energy management system may further include a battery management system between the third interface and the storage device, and configured to control charging and discharging operations of the storage device.

The battery management system may further be configured to perform at least one of an over-charge protection function, an over-discharging protection function, an over-current protection function, an overheat protection function, or a cell balancing operation, by determining voltage, current, and temperature of the storage device.

The storage device may include a battery.

Another embodiment of the present invention provides an energy storage system including the energy management system and the storage device.

BRIEF DESCRIPTION OF THE DRAWINGS

The accompanying drawings, together with the specification, illustrate exemplary embodiments of the present invention, and, together with the description, serve to explain the principles of the present invention.

Figure 1:
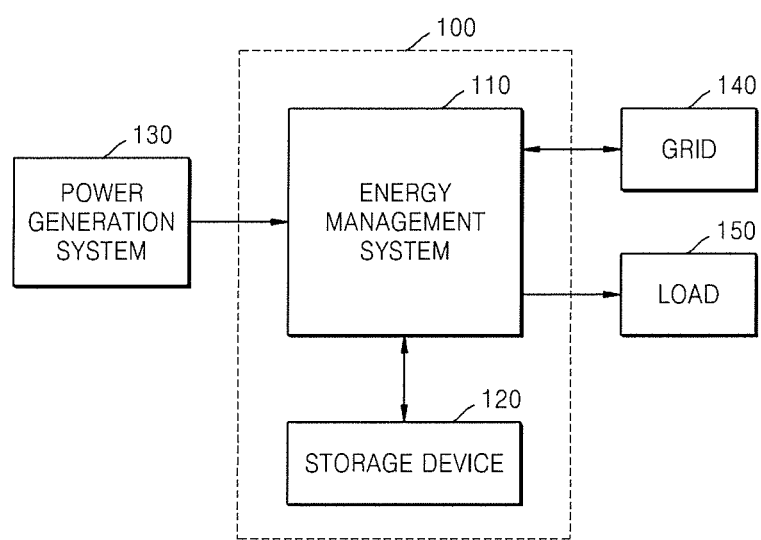
FIG. 1 is a block diagram of a grid-connected energy storage system according to an embodiment of the present invention.

EXPLANATIONS OF CERTAIN REFERENCE NUMERALS 100, 200: grid-connected energy storage system
110, 210: energy management system
120: storage device
140, 240: grid
111: first power converter
113: third power converter
116, 216: first switch
118: DC link portion
212: bi-directional inverter
214: integrated controller
220: battery
130, 230: power generation system
150, 250: load
112: second power converter
114: controller
117, 217: second switch
211: MPPT converter
213: bi-directional converter
215: BMS

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Embodiments of the present invention will be described in more detail with reference to accompanying drawings. Certain parts for comprehension of operations according to the embodiments of the present invention are described below, and certain other parts may be omitted in order not to complicate understanding of the present invention.

FIG. 1 is a block diagram of a grid-connected energy storage system 100 according to an embodiment of the present invention.

Referring to FIG. 1, the grid-connected energy storage system 100 of the present embodiment includes an energy management system 110 and a storage device 120, and the grid-connected energy storage system 100 is connected to a power generation system 130, a grid 140, and a load 150.

The energy management system 110 receives power from the power generation system 130; and transfers the power to the grid 140 or stores the power in the storage device 120 or supplies the power to the load 150. The generated power may be direct current (DC) power or alternating current (AC) power.

The energy management system 110 stores the power generated in the power generation system 130 in the storage device 120 or transfers the generated power to the grid 140 or supplies the generated power to the load 150. In addition, the energy management system 110 may transfer the power stored in the storage device 120 to the grid 140, may supply the stored power to the load 150, or may store the power supplied from the grid 140 in the storage device 120. Also, the energy management system 110 performs an uninterruptible power supply (UPS) operation in an abnormal state, for example, during a power failure of the grid 140, the energy management system 110 may be configured to supply the power to the load 150. Otherwise, the energy management system 110 may supply the power generated by the power generation system 130 and the power stored in the storage system 120 to the load 150 even when the grid 140 is in a normal state.

The energy management system 110 performs a power conversion operation for storing the generated power in the storage device 120, a power conversion operation for storing the generated power to the grid 140 or the load 150, a power conversion operation for storing the power of the grid 140 in the storage device 120, and a power conversion operation for supplying the power stored in the storage device 120 to the grid 140 or the load 150. In addition, the energy management system 110 monitors states of the storage device 120, the grid 140, and the load 150 in order to distribute the power generated by the power generation system 130, the power supplied from the grid 140, or the power stored in the storage device 120 to the storage device 120, the grid 140, and/or the load 150.

The storage device 120 is a large capacity storage device for storing the power supplied from the energy management system 110. The supplied power is converted from the power generated by the power generation system 130, or is converted from the utility power supplied from the grid 140. The power stored in the storage device 120 may be supplied to the grid 140 or to the load 150 according to control of the energy management system 110. The storage device 120 includes a secondary rechargeable battery, for example, a nickel-cadmium battery, a lead acid battery, a nickel metal hydride (NiMH) battery, a lithium ion battery, and/or a lithium polymer battery.

In the present embodiment, the grid-connected energy storage system 100 is configured to include the energy management system 110 and the storage system 120. However, the present invention is not limited thereto, and the grid-connected energy storage system may include the energy management system formed integrally with the storage device.

The power generation system 130 includes a system for generating electrical energy by using renewable energy, for example, an energy source such as solar energy, wind power, or tidal power. For example, when the power generation system 130 is a photovoltaic power generation system, a solar array converts solar light into electrical energy. In addition, the photovoltaic power generation system includes a plurality of modules which are connected in series and/or in parallel to each other and a supporter. However, the power generation system 130 may alternatively include a system for generating electrical energy by using some other suitable type of energy and/or power source.

Structures of the energy management system 110 and the grid-connected energy storage system 100 including the energy management system 110 will be described in more detail with reference to FIG. 2.

Figure 2:
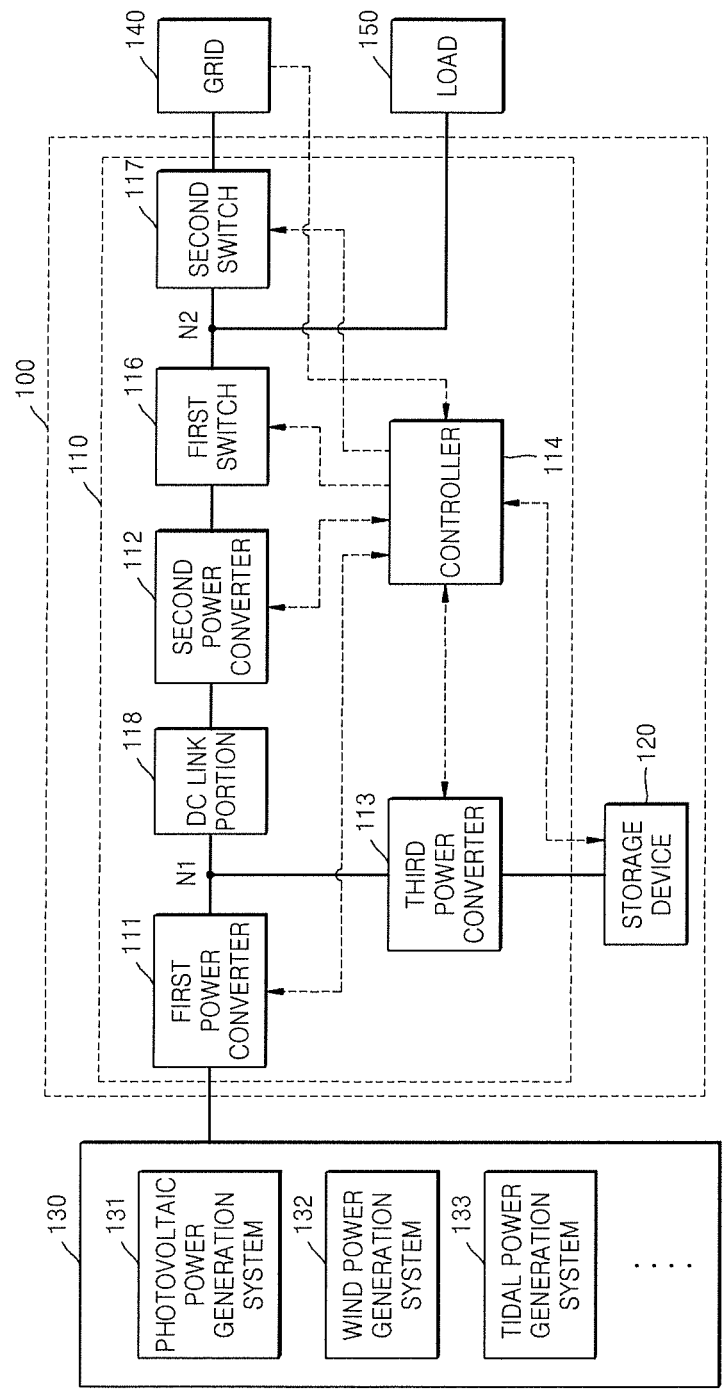
FIG. 2 is a detailed block diagram of the grid-connected energy storage system of FIG. 1.

FIG. 2 is a detailed block diagram of the grid-connected energy storage system 100 of FIG. 1.

Referring to FIG. 2, the energy management system 110 includes a first power converter 111, a second power converter 112, a third power converter 113, a controller 114, a first switch 116, a second switch 117, and a DC link portion 118. The energy management system 110 is connected (or coupled) to the power generation system 130, the storage device 120, the grid 140, and the load 150. Flows of the power between the components of FIG. 2 are denoted by solid lines, and flows of control signals are denoted by dotted lines.

The first power converter 111 is connected (or coupled) between the power generation system 130 and a first node N1, and converts the power (or first power) generated by the power generation system 130 to transfer the power to the first node N1. The power generated by the power generation system 130 may be DC power or AC power, and accordingly, the first power converter 111 converts the AC power or the DC power respectively to DC power of different voltages. The first power converter 111 may perform a rectification operation to convert the AC power to DC power (or sixth power), or may operate as a converter to convert the DC power to DC power (or sixth power) of different voltages. In addition, the first power converter 111 performs maximum power point tracking (MPPT) control in order to obtain the maximum power generated by a photovoltaic power generation system 131, a wind power generation system 132, or a tidal power generation system 133, according to a control (or control signal) of the controller 114.

The second power converter 112 is connected (or coupled) between the first node N1 and the grid 140, and operates as an inverter to convert the DC power converted by the first power converter 111 to AC power (or fourth power) for the grid 140 or converts the DC power converted by the third power converter 113 to AC power (or fourth power) for the grid 140. In addition, the second power converter 112 performs a rectification operation, that is, converts the utility AC power (or second power) supplied from the grid 140 to DC power (or eighth power) to transfer the DC power to the first node N1. Also, the second power converter 112 controls a conversion efficiency of power according to control of the controller 114.

The third power converter 113 is connected (or coupled) between the first node N1 and the storage device 120, and converts the DC power supplied via the first node N1 to DC power (or fifth power) of different voltages to transfer the converted DC power to the storage device 120. In addition, the third power converter 113 converts the DC power (or third power) stored in the storage device 120 to DC power (or seventh power) of different voltages to transfer the converted DC power to the first node N1. That is, the third power converter 113 operates as a converter which converts the DC power to DC power of different voltages. Also, the third power converter 113 controls a conversion efficiency according to the control of the controller 114.

The first switch 116 is connected (or coupled) between the second power converter 112 and a second node N2. The second switch 117 is connected between the second node N2 and the grid 140. The first switch 116 and the second switch 117 are configured to block the power(s) flowing between the second power converter 112, the grid 140, and the load 150 (e.g., the second power and/or fourth power), according to the control of the controller 114. The first switch 116 and the second switch 117 may be circuit breakers. Switching operations of the first and second switches 116 and 117 are controlled by the controller 114.

The DC link portion 118 maintains a DC voltage level at the first node N1 to be at a DC link level. The voltage level at the first node N1 may be unstable due to an instantaneous voltage sag of the power generation system 130 or the grid 140, or a peak load of the load 150. However, the voltage at the first node N1 should be stabilized in order for the second power converter 112 and the third power converter 113 to operate normally. Therefore, the DC link portion 118 maintains the DC voltage level at the first node N1 at a constant DC link voltage level.

The controller 114 controls overall operation of the grid-connected energy storage system 110. The controller 114 receives voltage sensing signals, current sensing signals, and temperature sensing signals sensed by the first, second, and third power converters 111, 112, and 113, and then outputs pulse width modulation (PWM) control signals to switching devices of the first through third power converters 111, 112, and 113 to control the conversion efficiencies. In addition, the controller 114 monitors states of the storage device 120, the grid 140, and the load 150, and determines a driving mode, for example, a power supply mode for supplying the power generated by the power generation system 130 to the grid 140, a power storage mode for storing the power in the storage device 120, and a power supply mode for supplying the power to the load 150, according to the monitored states of the storage device 120, the grid 140, and the load 150. The controller 114 controls the conversion operations and efficiencies of the first to third converters 111, 112, 113 and turning on/off operations of the first and second switches 116 and 117, according to the determined driving mode.

The power generation system 130 generates power (or first power) and outputs the generated power to the energy management system 110. The power generation system 130 may be the photovoltaic system 131, the wind power generation system 132, or the tidal power generation system 133. Otherwise, the power generation system 130 may be a power generation system generating power from renewable energy, such as geothermal energy. In particular, a solar battery generating power by using the photovoltaic energy may be easily installed in a house or a plant, and thus, may be suitable for the grid-connected energy storage system 100 which is distributed in each house.

The grid 140 may include a power plant, a substation, and power transmission cables. When the grid 140 is in a normal state, the grid 140 supplies the power to the storage device 120 or to the load 150 according to the turning on/off of the first and second switches 116 and 117, and receives the power supplied from the storage device 120 or the power generated from the power generation system 130. When the grid 140 is in an abnormal state caused by, for example, electric failure or electric repair work, the power supply from the grid 140 to the storage device 120 or to the load 150 is stopped, and the power supply from the storage device 120 to the grid 140 is also stopped.

The load 150 consumes the power generated by the power generation system 130, the power stored in the storage device 120, and/or the power supplied from the grid 140. The load 150 may be, for example, a house or a plant.

Figure 3:
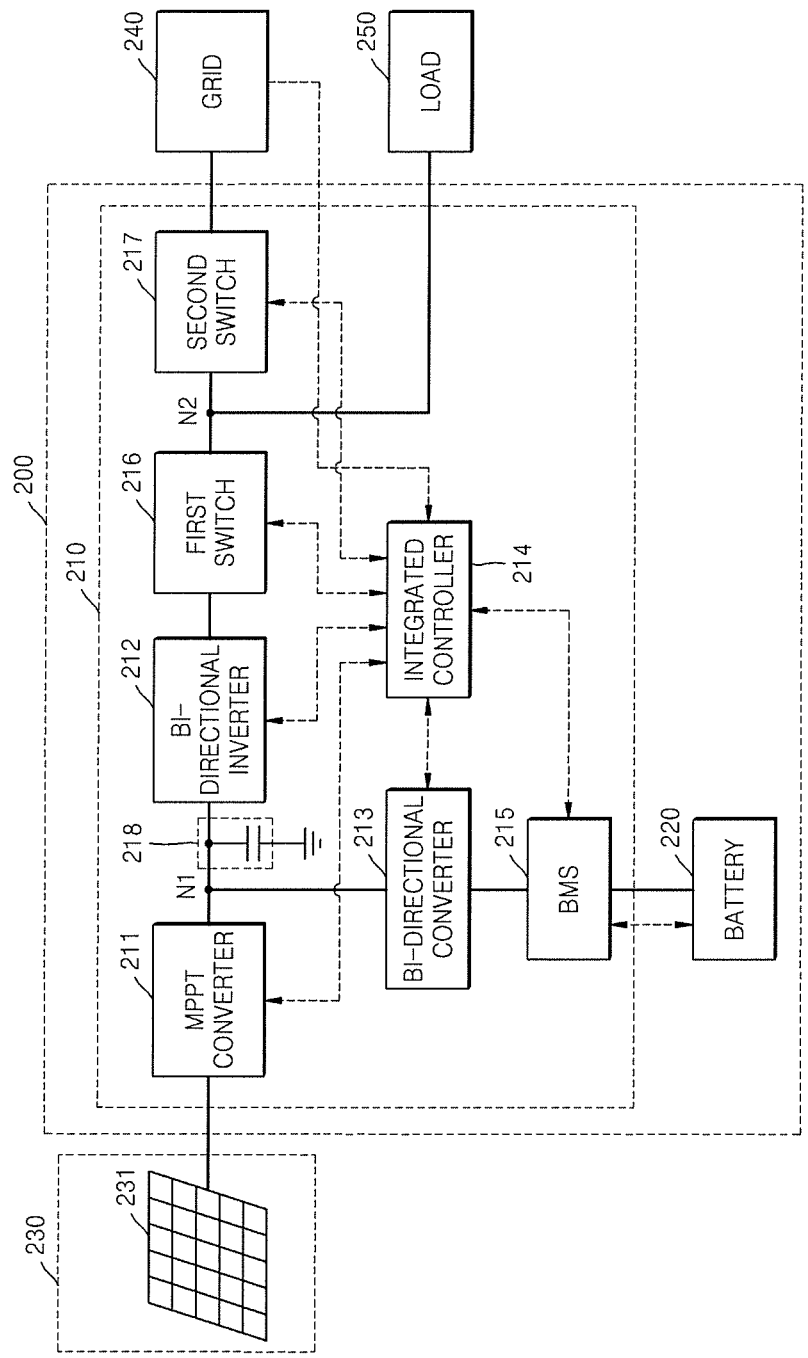
FIG. 3 is a block diagram of a grid-connected energy storage system according to another embodiment of the present invention.

FIG. 3 is a block diagram of a grid-connected energy storage system 200 according to another embodiment of the present invention.

Referring to FIG. 3, an energy management system 210 includes an MPPT converter 211, a bi-directional inverter 212, a bi-directional converter 213, an integrated controller 214, a battery management system (BMS) 215, the first switch 216, the second switch 217, and a DC link capacitor 218. The energy management system 210 is connected to a battery 220, a photovoltaic (PV) system 230 including a solar panel 231, the grid 240, and the load 250.

The MPPT converter 211 converts a DC voltage (or first power) output from the solar battery 231 to a DC voltage of the first node N1. Since an output of the solar panel 231 varies depending on weather conditions, such as solar radiation and temperature, and a load condition, the MPPT converter 211 controls the solar panel 231 to generate the maximum amount of power. That is, the MPPT converter 211 operates as a boost DC-DC converter, which boosts the DC voltage output from the solar battery 231 and outputs the boosted DC voltage, and as an MPPT controller. For example, the MPPT converter 211 may output a DC voltage in the range of about 300 V to about 600 V. In addition, the MPPT converter 211 performs the MPPT control for tracking the maximum output voltage from the solar battery 231. The MPPT control may be executed by a perturbation and observation (P&O) control method, an incremental conductance (IncCond) control method, or a power versus voltage control method. The P&O control method increases or reduces a reference voltage by measuring a current and a voltage of the solar panel 231. The IncCond control method is to control the output DC voltage by comparing an output conductance with an incremental conductance of the solar panel 231, and the power versus voltage control method is to control the output DC voltage by using a slope of a power versus voltage characteristic. Other MPPT control methods may also be used.

The DC link capacitor 218 is connected (or coupled) between the first node N1 and the bi-directional inverter 212 in parallel. The DC link capacitor 218 supplies the DC voltage (or sixth power) output from the MPPT converter 211 to the bi-directional inverter 212 or the bi-directional converter 213 while maintaining the DC voltage level at the DC link level, for example, DC 380 V. The DC link capacitor 218 may be an aluminum electrolytic capacitor, a polymer capacitor, or a multi layer ceramic capacitor (MLC). The voltage level at the first node N1 may be unstable due to variation in the DC voltage output from the solar battery 231, the instantaneous voltage sag of the grid 240, or the peak load occurring at the load 250. Therefore, the DC link capacitor 218 provides the bi-directional converter 213 and the bi-directional inverter 212 with the stabilized DC link voltage for normally operating the bi-directional converter 213 and the bi-directional inverter 212. In the present embodiment illustrated in FIG. 3, the DC link capacitor 218 is separately formed, however, the DC link capacitor 218 may be included in the bi-directional converter 213, the bi-directional inverter 212, or the MPPT converter 211.

The bi-directional inverter 212 is connected (or coupled) between the first node N1 and the grid 240. The bi-directional inverter 212 converts the DC voltage (or sixth power) output from the MPPT converter 211 and the DC voltage (or seventh power) output from the bi-directional converter 213 to an AC voltage (or fourth power) of the grid 240 or the load 250, and converts the AC voltage (or second power) supplied from the grid 240 to the DC voltage (or eighth power) to transfer the DC voltage to the first node N1. That is, the bi-directional inverter 212 operates both as an inverter for converting the DC voltage to the AC voltage and as a rectifier for converting the AC voltage to DC voltage.

The bi-directional inverter 212 rectifies the AC voltage (or second power) input from the grid 240 via the first and second switches 216 and 217 to the DC voltage (or eighth power) which is to be stored in the battery 220, and converts the DC voltage output from the battery 220 to AC voltage (or fourth power) for the grid 240. The AC voltage output to the grid 240 should match a power quality standard of the grid 240, for example, a power factor of 0.9 or greater and a total harmonic distortion (THD) of 5% or less. To this end, the bi-directional inverter 212 synchronizes a phase of the AC voltage with a phase of the grid 240 to prevent reactive power from being generated (or reduce the likelihood of reactive power being generated), and adjusts the AC voltage level. In addition, the bi-directional inverter 212 may include a filter for removing a harmonic from the AC voltage output to the grid 240, and the filter may have functions such as restriction of a voltage changing range, power factor improvement, removal (or reduction) of DC component, and protection of transient phenomena. The bi-directional inverter 212 of the present embodiment performs both as an inverter which converts the DC power of the power generation system 230 or the battery 220 to AC power to be supplied to the grid 240 or the load 250, and a rectifier which converts the AC power supplied from the grid 240 to DC power to be supplied to the battery 220.

The bi-directional converter 213 is connected between the first node N1 and the battery 220, and converts the DC voltage (or sixth power or the eighth power) at the first node N1 to the DC voltage (or fifth power) to be stored in the battery 220. In addition, the bi-directional converter 213 converts the DC voltage (or third power) stored in the battery 220 to a suitable DC voltage (or seventh power) level to be transferred to the first node N1. For example, when the DC power (or first power) generated by the photovoltaic power generation system 230 is charged in the battery 220 or the AC power (or second power) supplied from the grid 240 is charged in the battery 220, that is, in a battery charging mode, the bi-directional converter 213 functions as a converter which decompresses (or reduces) the DC voltage level at the first node N1 or the DC link voltage level maintained by the DC link capacitor 218, for example, a DC voltage of 380 V, down to a battery storing voltage, for example, a DC voltage of 100V. In addition, when the power (or third power) charged in the battery 220 is supplied to the grid 240 or to the load 250, that is, in a battery discharging mode, the bi-directional converter 213 functions as a converter which boosts the battery storing voltage, for example, a DC voltage of 100V, to the DC voltage level at the first node N1 or the DC link voltage level, for example, a DC voltage of 380 V. The bi-directional converter 213 of the present embodiment converts the DC power generated by the photovoltaic power generation system 230 or the DC power converted from the AC power supplied from the grid 240 to DC power to be stored in the battery 220, and converts the DC power stored in the battery 220 to DC power to be input into the bi-directional inverter 212 for supplying the DC power to the grid 240 or to the load 250.

The battery 220 stores the power supplied from the photovoltaic power generation system 230 or the grid 240. The battery 220 may include a plurality of battery cells which are connected in series or in parallel with each other to increase a capacity and an output thereof, and charging and discharging operations of the battery 220 are controlled by the BMS 215 or the integrated controller 214. The battery 220 may include various suitable kinds of battery cells, for example, a nickel-cadmium battery, a lead-acid battery, an NiMH battery, a lithium ion battery, and/or a lithium polymer battery. The number of battery cells configuring the battery 220 may be determined according to a power capacity required by the grid-connected energy storage system 200 and/or conditions of designing the battery 220.

The BMS 215 is connected to the battery 220, and controls the charging/discharging operations of the battery 220, according to the control of the integrated controller 214. The power discharged from the battery 220 to the bi-directional converter 213 and the power charged in the battery 220 from the bi-directional converter 213 are transferred via the BMS 215. In addition, the BMS 215 may have functions such as an over-charging protection, an over-discharging protection, an over-current protection, an overheat protection, and a cell balancing operation. To this end, the BMS 215 detects the voltage, current, and temperature of the battery 220 to determine a state of charge (SOC) and a state of health (SOH) of the battery 220, thereby monitoring remaining power and lifespan of the battery 220.

The BMS 215 may include a micro-computer which performs a sensing function for detecting the voltage, current, and temperature of the battery 220 and determines the over-charging, the over-discharging, the over-current, the cell balancing, the SOC, and the SOH, and a protection circuit, which protects the charging/discharging, fusing, and cooling of the battery 220 according to a control signal of the micro-computer. In FIG. 3, the BMS 215 is included in the energy management system 210 and is separated from the battery 220, however, a battery pack including the BMS 215 and the battery 220 as an integrated body may be formed. In addition, the BMS 215 controls the charging and discharging operations of the battery 220, and transfers status information of the battery 220, for example, information about charged power amount obtained from the determined SOC, to the integrated controller 214.

The first switch 216 is connected between the bi-directional inverter 212 and the second node N2. The second switch 217 is connected between the second node N2 and the grid 240. The first and second switches 216 and 217 are turned on or turned off by the control of the integrated controller 214, and supply or block the power of the photovoltaic power generation system 230 or the battery to the grid 240 or to the load 250, and supply or block the power from the grid 240 to the load 250 or the battery 220. For example, when the power generated by the photovoltaic power generation system 230 or the power stored in the battery 220 is supplied to the grid 240, the integrated controller 214 turns the first and second switches 216 and 217 on. In addition, when only the power from the grid 240 is supplied to the load 250, the integrated controller 214 turns the first switch 216 off and turns the second switch 217 on.

The second switch 217 blocks the power supply to the grid 240 and makes the grid-connected energy storage system 200 solely operate according to the control of the integrated controller 214, when an abnormal situation occurs in the grid 240, for example, an electric failure occurs or distribution lines need to be repaired. At this time, the integrated controller 214 separates the energy management system 210 from the grid 240 to prevent (or reduce the likelihood of) an accident, such as an electric shock applied to a worker working on the line management or repair from occurring, and to prevent the grid 240 from (or reduce the likelihood of the grid 240) negatively affecting electrical equipment due to the operation in the abnormal state. In addition, when the grid 240 recovers to the normal state from the operation in the abnormal state, that is, the power generated by the photovoltaic power generation system 230 or the power stored in the battery 220 is supplied to the load 250, a phase difference is generated between the voltage of the grid 240 and the output voltage of the battery 220 which is in the sole operating state, and thus, the energy management system 210 may be damaged. The integrated controller 214 performs a sole operation preventing control in order to address the above problem.

The integrated controller 214 controls overall operations of the energy management system 210. The control operations of the integrated controller 214 will be described with reference to FIG. 4 in more detail.

Figure 4:
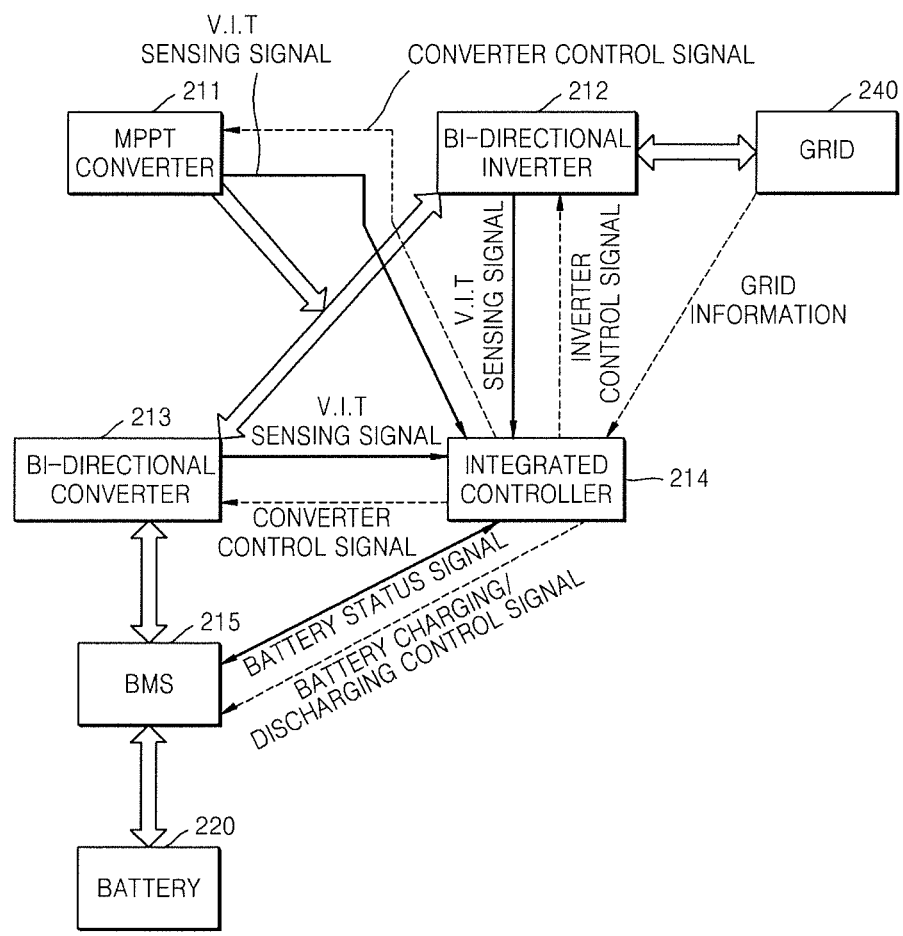
FIG. 4 is a diagram illustrating flows of a power signal and a control signal in the grid-connected energy storage system of FIG. 3.

FIG. 4 is a diagram illustrating flows of the power and control signals in the grid-connected energy storage system 200 of FIG. 3.

Referring to FIG. 4, the flow of power between the internal components in the grid-connected energy storage system 200 of FIG. 3 and the control flow of the integrated controller 214 are illustrated. As shown in FIG. 4, the DC level voltage converted by the MPPT converter 211 is supplied to the bi-directional inverter 212 and the bi-directional converter 213. In addition, the DC level voltage supplied to the bi-directional inverter 212 is converted to the AC voltage by the bi-directional inverter 212 to be supplied to the grid 240, or the DC level voltage supplied to the bi-directional converter 213 is converted to the DC voltage by the bi-directional converter 213 to be charged in the battery 220 and is charged in the battery 220 via the BMS 215. The DC voltage charged in the battery 220 is converted to an input DC voltage level of the bi-directional inverter 212 by the bi-directional converter 213, and then, is converted to the AC voltage suitable for the standard of the grid by the bi-directional inverter 212 to be supplied to the grid 240.

The integrated controller 214 controls overall operations of the grid-connected energy storage system 200, and determines an operating mode of the system 200, for example, determines whether the generated power will be supplied to the grid, to the load, or stored in the battery, and whether the power supplied from the grid will be stored in the battery.

The integrated controller 214 transmits control signals for controlling switching operations of the MPPT converter 211, the bi-directional inverter 212, and the bi-directional converter 213. The control signals may reduce a loss of power caused by the power conversion executed by the converter 211 or 213, or the inverter 212 by controlling a duty ratio with respect to the input voltage of the each converter or the inverter. To this end, the integrated controller 214 receives signals for sensing the voltage, the current, and the temperature at an input terminal of each of the MPPT converter 211, the bi-directional inverter 212, and the bi-directional converter 213, and transmits the converter control signal and the inverter control signal based on the received sensing signals.

The integrated controller 214 receives grid information including information about the grid status and information about the voltage, the current, and the temperature of the grid from the grid 240. The integrated controller 214 determines whether or not the abnormal situation occurs in the grid 240 and whether or not the power of the grid is returned, and performs a sole operation prevention control through a controlling operation for blocking the power supply to the grid 240 and a controlling operation of matching the output of the bi-directional inverter 212 and the supplied power of the grid 240 after returning the power of the grid 240.

The integrated controller 214 receives a battery status signal, that is, a signal indicating the charging/discharging states of the battery, through communication with the BMS 215, and determines the operating mode of the system 200 based on the received signal. In addition, the integrated controller 214 transmits a signal for controlling charging/discharging of the battery to the BMS 215 according to the operating mode, and the BMS 215 controls the charging and discharging operations of the battery 220 according to the transmitted signal.

Figure 5:
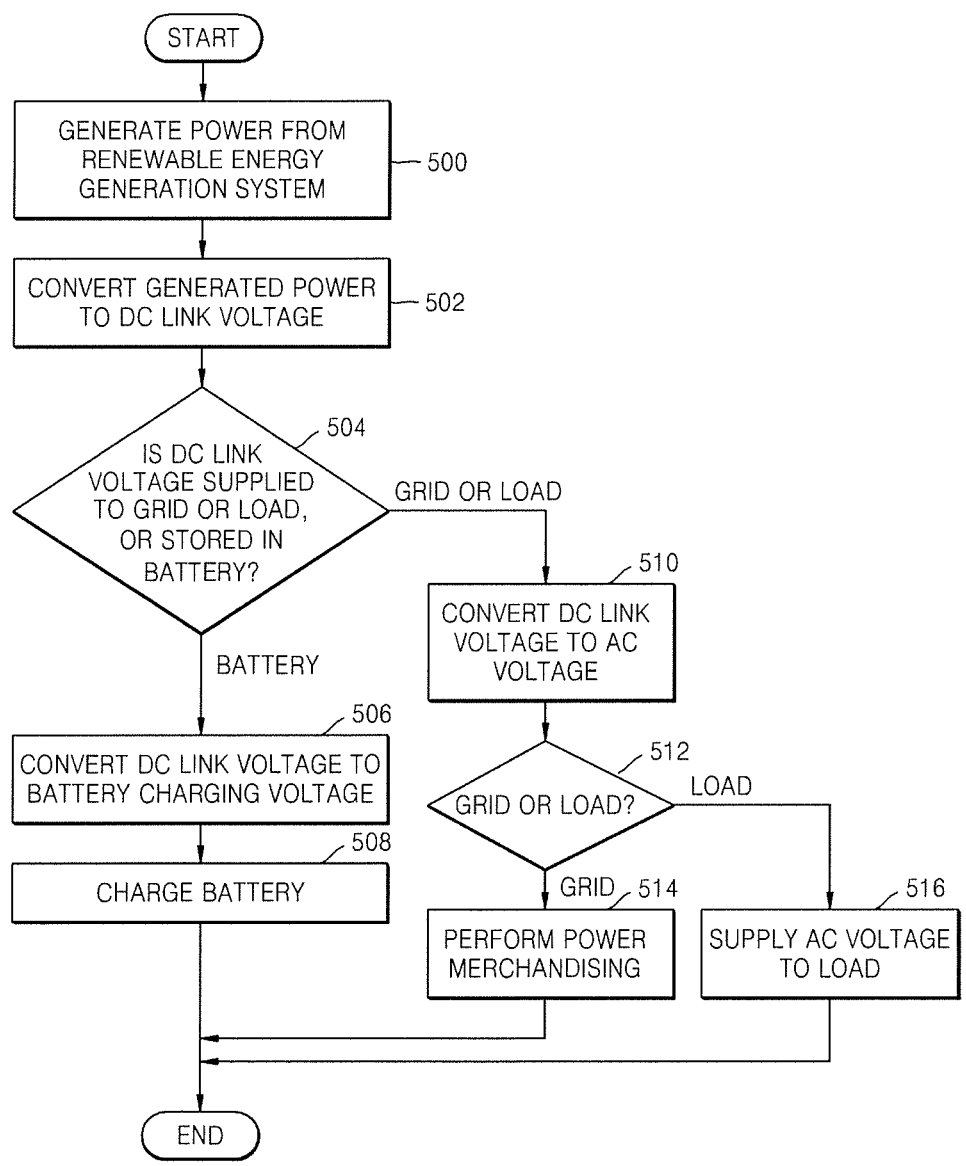
FIG. 5 is a flowchart illustrating operations of a grid-connected energy storage system according to an embodiment of the present invention.

FIG. 5 is a flowchart illustrating a method of operating a grid-connected energy storage system according to an embodiment of the present invention.

Referring to FIG. 5, a renewable energy generation system generates power in operation 500. The renewable energy generation system may be, but is not limited to, a photovoltaic energy generation system, a wind power generation system, and/or a tidal power generation system, and the generated power may be DC power or AC power. In operation 502, a voltage of the generated power is converted to a DC link voltage. The DC link voltage is a DC voltage having a constant DC voltage level to be input to an inverter or a converter from the power having an unstable voltage level generated in operation 500.

In operation 504, it is determined whether the power generated in operation 500 will be supplied to a grid or to a load, or will be stored in a battery. The above determination of operation 504 is based on a current power selling price to the system, the generated power amount, required load's power consumption amount, and/or the power charged in the battery. As a result of the determination of operation 504, if it is determined that the generated power is to be stored in the battery, the DC link voltage converted in operation 502 is converted to the battery charging voltage and charged in the battery in operations 506 and 508.

As a result of the determination of operation 504, if the generated power is to be supplied to the grid or to the load, the DC link voltage converted in operation 502 is converted to an AC voltage which corresponds to AC voltage standard of the grid or the load in operation 510. In operation 512, it is determined whether the AC voltage will be supplied to the grid or to the load. In operation 514, the AC voltage is supplied to the grid, and in operation 516, the AC voltage is supplied to the load.

Figure 6:
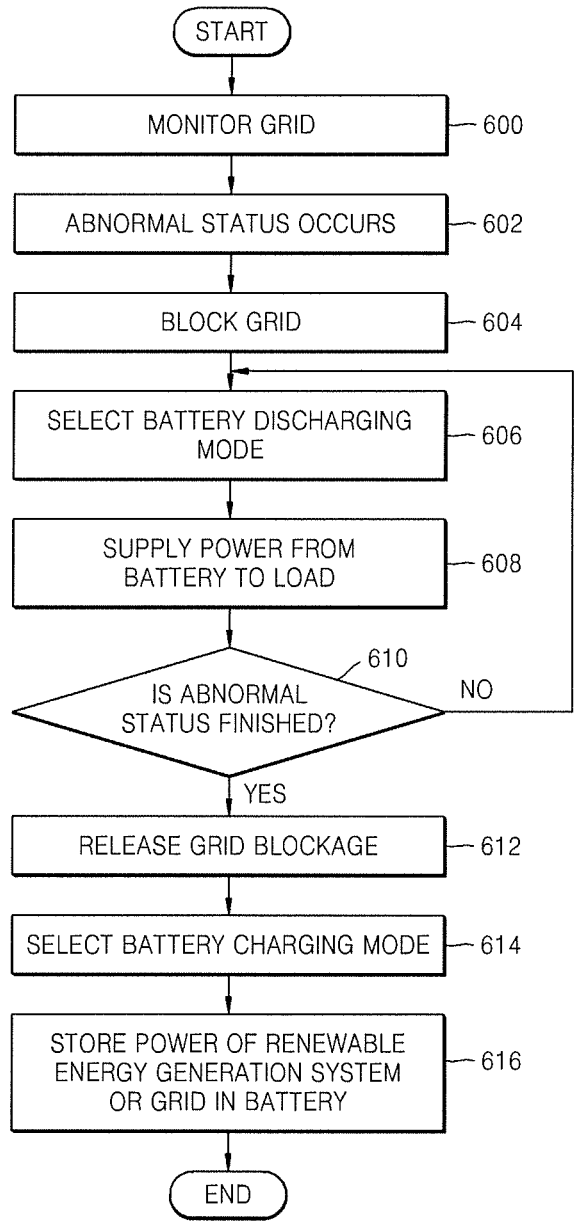
FIG. 6 is a flowchart illustrating operations of a grid-connected energy storage system according to an embodiment of the present invention.

FIG. 6 is a flowchart illustrating a method of operating a grid-connected energy storage system according to another embodiment of the present invention.

Referring to FIG. 6, a grid condition is monitored in operation 600. The grid condition may include information about whether an electric failure occurs or not in the grid, whether the power is returned in the grid, whether distribution lines are repaired, and information about voltage, current, and temperature of the grid. In operation 602, it is sensed whether an abnormal state occurs in the grid. In operation 604, the power supply to the grid is blocked. When the power supply to the grid is blocked, the grid-connected energy storage system may solely operate in a stabilized state. In operation 606, a battery discharging mode is selected. At this time, if the power is sufficiently generated by the renewable energy generation system, the power generated by the renewable energy generation system may be supplied to the load. In operation 608, the power stored in the battery is supplied to the load. In operation 610, it is determined whether the abnormal situation of the grid is finished. If it is determined that the abnormal situation of the grid is finished, the blockage of the grid is released in operation 612. Before releasing the blockage of the grid, a current status of the power in the grid may be checked, and then, it may be tested whether the voltage of the grid and a grid connected voltage of the energy storage system, that is, the power supplied to the grid, match each other. In operation 614, a battery charging mode is selected, and in operation 616, the power generated by the renewable energy generation system or the power of the grid is stored in the battery. The charging is executed to a level at which the battery may supply the power sufficiently in the above abnormal situation, and after that, the power generated by the renewable energy generation system is supplied to the battery, the load, or the grid if necessary.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An energy management system comprising:
    a first interface configured to receive a first power from a power generation system;
    a second interface configured to couple to the power generation system, a power grid, and a storage device, and to receive at least one of the first power from the power generation system, a second power from the power grid, or a third power from the storage device, and to supply a fourth power to at least one of the power grid or a load; and
    a third interface configured to receive the third power from the storage device, and to supply a fifth power to the storage device for storage,
    wherein the third interface is further configured to receive at least one of the first power converted by the first interface or the second power converted by the second interface.

2. The energy management system of claim 1, wherein the second interface is configured to receive the second power and the first power converted by the first interface concurrently or at different times.

3. The energy management system of claim 1, wherein the third interface is configured to receive the third power, the first power converted by the first interface, and the second power converted by the second interface, concurrently or at different times.

4. The energy management system of claim 1, wherein the system is configured to store the second power from the power grid in the storage device via the second and third interfaces as the fifth power, or to supply the second power to the load.

5. The energy management system of claim 1, wherein the system is configured to store the first power in the storage device via the third interface as the fifth power, or to transfer the first power via the second interface to at least one of the power grid or the load as the fourth power.

6. The energy management system of claim 5, wherein the system is further configured to supply the first power or the third power to the load as the fourth power even if the power grid is in a normal operating state.

7. The energy management system of claim 1, further comprising a battery management system between the third interface and the storage device, and configured to control charging and discharging operations of the storage device.

8. The energy management system of claim 7, wherein the battery management system is further configured to perform at least one of an over-charge protection function, an over-discharging protection function, an over-current protection function, an overheat protection function, or a cell balancing operation, by determining voltage, current, and temperature of the storage device.

9. The energy management system of claim 1, wherein the storage device comprises a battery.

10. An energy storage system comprising the energy management system of claim 1 and the storage device.

11. An energy management system comprising:
a first interface configured to receive a first power from a power generation system;
a second interface configured to couple to the power generation system, a power grid, and a storage device, and to receive at least one of the first power from the power generation system, a second power from the power grid, or a third power from the storage device, and to supply a fourth power to at least one of the power grid or a load; and
a third interface configured to receive the third power from the storage device, and to supply a fifth power to the storage device for storage,
wherein the first interface comprises a first power converter configured to convert the first power from DC or AC power to a DC sixth power,
wherein the second interface comprises a second power converter and the third interface comprises a third power converter,
wherein the second power converter is configured to:
convert the DC sixth power to the fourth power, which is an AC power;
convert a seventh power from the third power converter from DC power to the fourth power; and
convert the second power from AC power to an eighth power, which is a DC power, and
wherein the third power converter is configured to:
convert the sixth power or the eighth power to the fifth power; and
convert the third power to the seventh power.

12. The energy management system of claim 11, wherein the second power converter is further configured to control a power conversion efficiency.

13. The energy management system of claim 11, wherein the third power converter is further configured to control a power conversion efficiency.

14. The energy management system of claim 11, further comprising: a first switch between the second power converter, and the power grid and the load; and a second switch between the first switch and the power grid wherein the first and second switches are configured to be controlled in accordance with a control signal from a controller.

15. The energy management system of claim 14, wherein the controller is configured to turn the first switch on and the second switch off to supply the fourth power to the load.

16. The energy management system of claim 11, further comprising a controller configured to:
receive at least one of a voltage sensing signal, a current sensing signal or a temperature sensing signal from at least one of the first, second and third power converters;
output a pulse width modulation control signal to at least one of the first, second or third power converters;
monitor a status of at least one of the storage device, the power grid, or the load;
determine a driving mode; and
control conversion operations and/or efficiencies of at least one of the first, second, and third converters or the first and second switches.

17. The energy management system of claim 11, further comprising a DC stabilizer between the first and third power converters and the second power converter, and configured to maintain a constant DC voltage level at an input of the second power converter and at an input of the third power converter.

18. The energy management system of claim 17, wherein the DC stabilizer comprises a capacitor.

19. The energy management system of claim 11, wherein the first power converter is further configured to perform maximum power point tracking control to obtain a maximum power generated by the power generation system.

20. An energy management system comprising:
a first interface configured to receive a first power from a power generation system;
a second interface configured to couple to the power generation system, a power grid, and a storage device, and to receive at least one of the first power from the power generation system, a second power from the power grid, or a third power from the storage device, and to supply a fourth power to at least one of the power grid or a load; and
a third interface configured to receive the third power from the storage device, and to supply a fifth power to the storage device for storage,
wherein the first interface comprises a maximum power point tracking converter configured to:
convert the AC or DC first power to a sixth power, which is a DC power; and
perform a maximum power point tracking control for tracking the maximum output voltage from the power generation system,
wherein the second interface comprises a bi-directional inverter and the third interface comprises a bi-directional converter,
wherein the bi-directional inverter is configured to:
convert the DC sixth power to the fourth power, which is an AC power;
convert a seventh power from the bi-directional converter from DC power to the fourth power; and
convert the second power from AC power to an eighth power, which is a DC power, and
wherein the bi-directional converter is configured to:
convert the sixth power or the eighth power to the fifth power; and
convert the third power to the seventh power.

21. The energy management system of claim 20, further comprising a DC link capacitor between the bi-directional inverter, and the maximum power point tracking converter and the bi-directional converter, and configured to:
supply the sixth power to the bi-directional inverter or the bi-directional converter; and
stabilize the DC voltage level at an input of the bi-directional converter and at an input of the bi-directional inverter.

22. An energy management system comprising:
- a first interface configured to receive a first power from a power generation system;
- a second interface configured to couple to the power generation system, a power grid, and a storage device, and to receive at least one of the first power from the power generation system, a second power from the power grid, or a third power from the storage device, and to supply a fourth power to at least one of the power grid or a load; and
- a third interface configured to receive the third power from the storage device, and to supply a fifth power to the storage device for storage,
- wherein the system is configured to supply the third power from the storage device via the second interface to the power grid or the load as the fourth power.

* * * * *